United States Patent
Wittenstein et al.

(10) Patent No.: US 6,189,391 B1
(45) Date of Patent: Feb. 20, 2001

(54) LINEAR DRIVE HAVING A DEVICE FOR SENSING AND EVALUATING AN OPERATIONAL FORCE ACTING THEREON

(75) Inventors: Manfred Wittenstein, Bad Mergentheim; Hans-Hermann Spohr, Calw, both of (DE)

(73) Assignee: Wittenstein Motion Control GmbH, Igersheim (DE)

( * ) Notice: Under 35 U.S.C. 154(b), the term of this patent shall be extended for 0 days.

(21) Appl. No.: 09/180,116
(22) PCT Filed: Jun. 12, 1997
(86) PCT No.: PCT/DE97/01182
 § 371 Date: Nov. 12, 1998
 § 102(e) Date: Nov. 12, 1998
(87) PCT Pub. No.: WO97/47953
 PCT Pub. Date: Dec. 18, 1997

(30) Foreign Application Priority Data

Jun. 14, 1996 (DE) .............................. 196 23 741

(51) Int. Cl.[7] ...................................... G01L 1/12
(52) U.S. Cl. .......................... 73/862.69; 73/779
(58) Field of Search ................ 73/779, 862.333, 73/862.335, 862.69

(56) References Cited

U.S. PATENT DOCUMENTS

| | | |
|---|---|---|
| 4,222,692 * | 9/1980 | Pavlovsky ........................ 409/141 |
| 4,307,799 * | 12/1981 | Zouzoulas ........................ 192/150 |
| 4,924,713 | 5/1990 | Machino et al. . |
| 4,955,241 | 9/1990 | Schiessle et al. . |
| 4,977,782 | 12/1990 | Stöhr et al. . |
| 5,400,656 | 3/1995 | Schiessle et al. . |

FOREIGN PATENT DOCUMENTS

| | | |
|---|---|---|
| 1 190 759 | 4/1965 | (DE) . |
| 1 219 251 | 6/1966 | (DE) . |
| 30 15 535 | 11/1980 | (DE) . |
| 34 37 246 | 4/1986 | (DE) . |
| 39 08 175 | 9/1989 | (DE) . |
| 38 19 083 | 12/1989 | (DE) . |
| 41 21 507 | 1/1992 | (DE) . |
| 0 142 110 | 5/1985 | (EP) . |
| 0 656 500 | 6/1995 | (EP) . |
| 0 737 831 | 10/1996 | (EP) . |
| WO 94/07118 | 3/1994 | (WO) . |

\* cited by examiner

*Primary Examiner*—Max Noori
(74) *Attorney, Agent, or Firm*—Collard & Roe, P.C.

(57) ABSTRACT

A linear drive having a device for sensing and evaluating an operational force acting on the linear drive is to be of simple design and is to be constructed so as to be functionally effective with a high degree of accuracy.

For this purpose, the operational force on the bearing part supporting the displaceable part of the linear drive in a housing is sensed and electronically evaluated by a magnetostrictive force sensor.

2 Claims, 1 Drawing Sheet

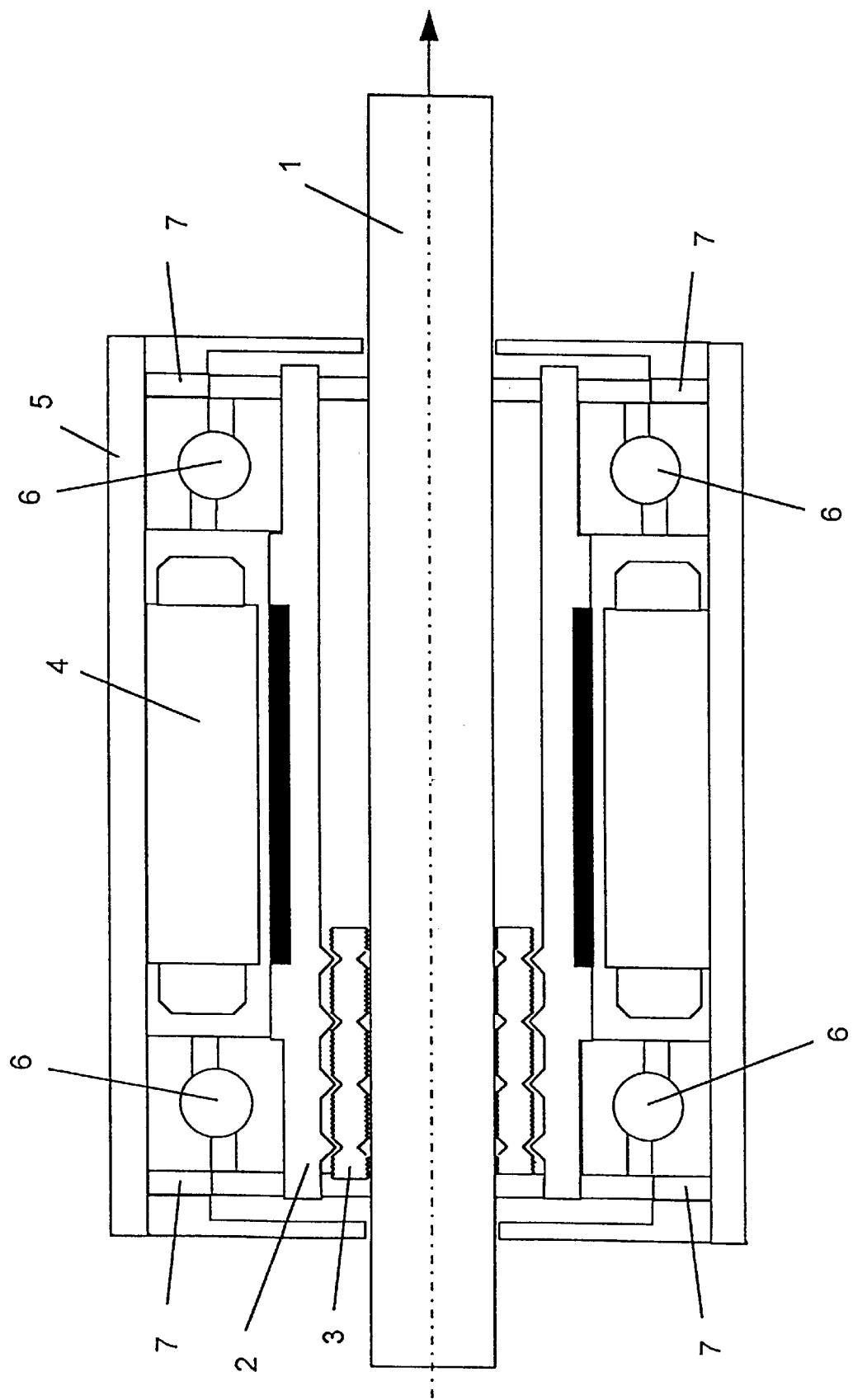

LINEAR DRIVE HAVING A DEVICE FOR SENSING AND EVALUATING AN OPERATIONAL FORCE ACTING THEREON

The present invention relates to a linear drive having a device for sensing and evaluating an operational force acting thereon.

Such a linear drive is known from U.S. Pat. No. 4,977,782. In this patent, the device for sensing and evaluating an operational force acting on the drive is a torque-measuring device which is installed at a weak point of the housing.

The older, non-prepublished application EP 0 737 831 A 1 also describes a device of the generic type.

The present invention is concerned with the problem of providing a device of the generic type which is of as simple a design as possible and operates satisfactorily and with a high degree of precision.

By means of such combination and arrangement of a plurality of magnetostrictive sensors, it is possible to measure forces which occur transversely with respect to the longitudinal axis and which are particularly detrimental to the operational reliability of a linear drive which is designed, for example, as a spindle drive.

In particular, an electromotively powered linear drive according to the invention can be advantageously controlled in an open-loop and/or closed-loop fashion as a function of the signals of the magnetostrictive force sensor.

Magnetostrictive force sensors are known per se, for which reason it is not necessary to provide further explanations at this point.

An exemplary embodiment of the invention is illustrated in the single FIG. 1 of the drawing.

Said figure is a schematic view of a section through a spindle drive as an example of a linear drive.

The spindle drive is a planetary roller-type spindle drive in which a threaded rod 1 is actuated in a non-rotating fashion by a spindle nut 2 by means of planetary rollers 3. The spindle nut 2 is an integral component of the rotor of a fixed electrical drive motor 4.

The rotor of the electric motor 4 is mounted, together with the spindle nut 2, in roller bearings 6 in the fixed housing 5 of the spindle drive. The respective outer bearing rings of the roller bearings 6 are mounted in an essentially non-rotatable, longitudinally displaceable fashion in the gear mechanism housing 5. When the threaded rod 1 is displaced in the direction of the indicated arrow, a reaction force in the longitudinal direction of the threaded rod 1 occurs in the outer bearing rings which are supported on the gear mechanism housing 1. This reaction force is determined by in each case at least one magnetorestrictive force sensor (7) which is mounted between the, in the drawing, respective outer bearing ring of the bearing 6 and a radial stop within the spindle-drive housing 5 for axially absorbing forces.

The signals which these force sensors determine are evaluated electronically and used for the open-loop and/or closed-loop control of the spindle drive.

In this way it is possible to protect the spindle drive against overloading by force, by virtue of the fact that the spindle drive is switched off or its torque is reduced.

By means of these force sensors it is also possible to use the spindle drive to transmit forces which are closed-loop controlled in terms of size.

What is claimed is:

1. A linear drive comprising
   a displaceable component and a housing for a driving means which cooperates with the displaceable component and rotates about a common axle of the displaceable component and the housing;
   a bearing device supporting the driving means in the housing, with at least one first bearing component supported on the driving means, and at least one second bearing component (6) supported on the housing, in the form of a bearing ring;
   a device comprising a force sensor (7) for detecting and evaluating a driving force acting on the linear drive; said force sensor (7) is axially clamped between the at least one bearing ring (6) and the housing (5); the axially clamped force sensor (7) is supported between support surfaces of the at least one bearing ring and the housing (5), said surfaces axially opposing each other; and
   the at least one second bearing component is essentially non-rotatable longitudinally displaceable with respect to the housing (5).

2. The linear drive, according to claim 1, particularly driven by an electric motor,
   wherein said force sensor (7) is a magnetostrictive force sensor (7) for control and regulation of the drive depending on signals from said force sensor (7).

* * * * *